United States Patent Office 2,907,797
Patented Oct. 6, 1959

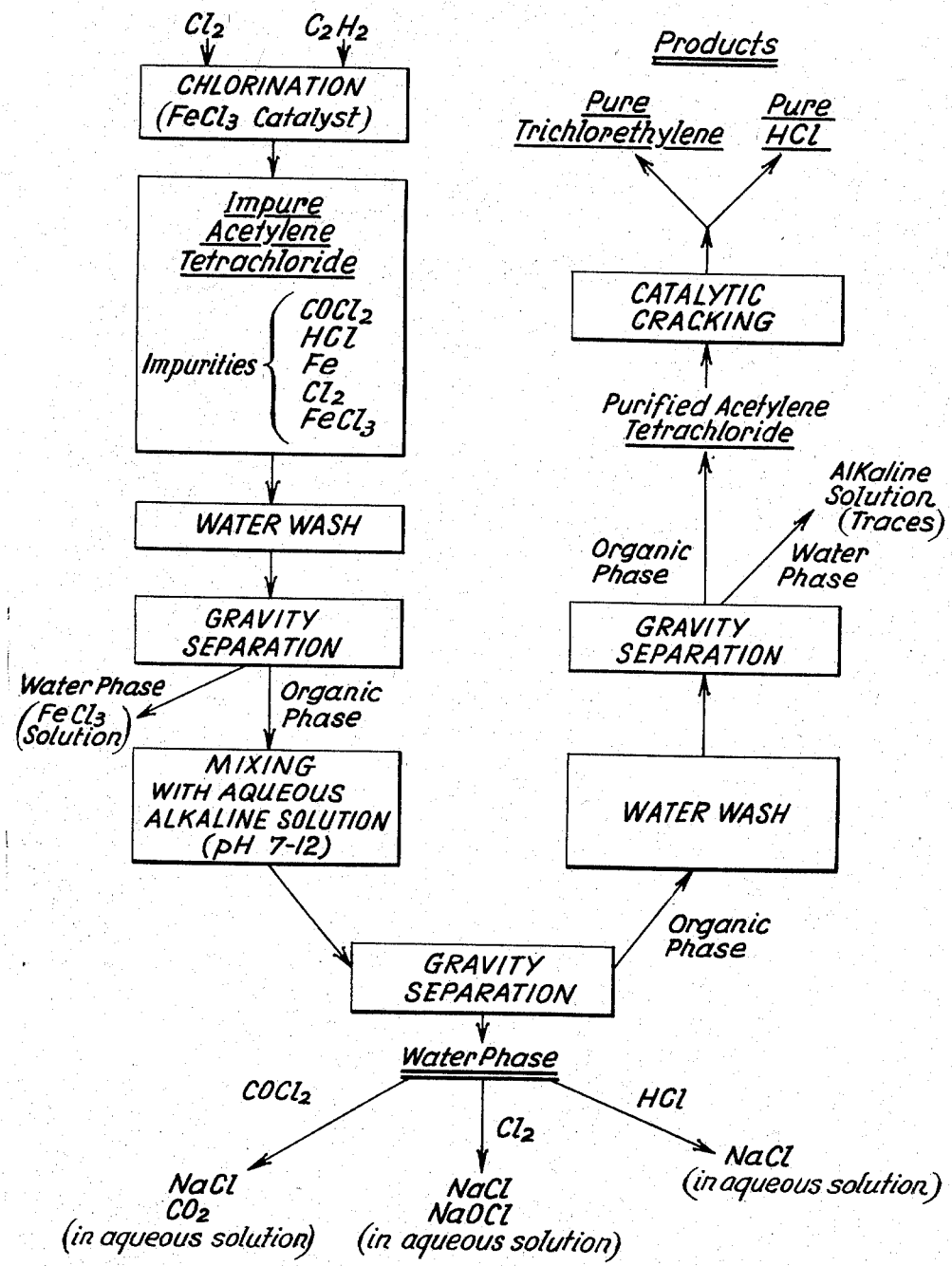

2,907,797

PURIFICATION OF ACETYLENE TETRACHLORIDE

Wilbur H. Petering and John R. Berger, Detroit, Mich., assignors to Detrex Chemical Industries, Inc., a corporation of Michigan Application April 19, 1955, Serial No. 502,463

2 Claims. (Cl. 260—652)

This invention relates to the purification of crude acetylene tetrachloride in a process of manufacturing pure trichloethylene and pure hydrogen chloride. More specifically, this invention relates to a process wherein acetylene and chlorine are reacted to produce acetylene tetrachloride which is subsequently decomposed or cracked to produce trichlorethylene and hydrogen chloride, and wherein organic impurities are produced in the acetylene-chlorine reaction, which impurities are removed from the acetylene tetrachloride prior to the decomposition of the acetylene tetrachloride.

In the manufacture of the acetylene tetrachloride by reacting acetylene with chlorine, certain impurities appear in the product which are inherent in the process of manufacture. Such impurities include phosgene, excess chlorine, hydrogen chloride, iron, and iron chloride. Since organic impurities are miscible with trichlorethylene in the liquid state, it is difficult to remove them physically from the trichlorethylene. Accordingly, in processes wherein crude acetylene tetrachloride is cracked in order to produce trichlorethylene and hydrogen chloride, many of the impurities are found in the trichlorethylene product.

In many methods of producing acetylene tetrachloride, metallic salts as ferric chloride and the like are used as catalysts. As a result, limited quantities of metallic salts often appear in the crude acetylene tetrachloride. Various other impurities, such as hydrogen chloride which results from the substitution of chlorine for hydrogen, as well as excess chlorine are also found in the acetylene tetrachloride product. Various physical methods for separating the impurities from the acetylene tetrachloride do not, in most cases, yield a product of the highest degree of purity required.

One of the principal uses of acetylene tetrachloride is as a raw material for the manufacture of chlorinated solvents such as trichlorethylene and perchlorethylene for example. The impurities present in the crude acetylene tetrachloride are highly undesirable particularly when it is desired to produce trichlorethylene by thermal or catalytic cracking in order to recover the valuable co-product hydrogen chloride. Since it is frequently desired to use the hydrogen chloride as a raw material for the manufacture of valuable chlorinated compounds, such as vinyl chloride for example, it is important that the hydrogen chloride be pure, as well as the trichlorethylene. In view of the presence of chlorine, phosgene and the like as impurities in the acetylene tetrachloride, those impurities or their derivatives are often found in the hydrogen chloride produced by the catalytic cracking of the crude acetylene tetrachloride.

Accordingly, it will be appreciated that, if impurities such as chlorine, phosgene and other gaseous impurities present in the acetylene tetrachloride were carried through the cracking process, they would contaminate the non-condensible hydrogen chloride product, thereby limiting its use as a raw material in subsequent manufacturing processes. Moreover, if impurities such as chlorine, phosgene and other contaminants originating in the acetylene tetrachloride were carried through the cracking process and were present in the trichlorethylene product, the removal of these contaminants by conventional physical methods would be very difficult. Moreover, in the cracking of acetylene tetrachloride, catalyst is often used, and the presence of the aforementioned impurities has a deleterious effect on the catalyst. For example, ferric chloride or other metallic salts may seriously limit the activities and the active life of the catalyst. It is an object of this invention to overcome the difficulties and disadvantages just discussed. Other objects and advantages of this invention will further appear hereinafter.

We have found that, although a simple fractional distillation of crude acetylene tetrachloride does not yield a product which is suitable either for industrial use or as a feed for subsequent processes such as thermal or catalytic cracking, the impurities may be substantially completely removed or reduced to such a low concentration that they do not interfere with the catalytic cracking process or with the purity of the trichlorethylene, perchlorethylene or hydrogen chloride products.

The drawing represents a flow diagram illustrating the method steps and some of the reactions which take place in accordance with a preferred method utilizing features of this invention.

Referring now to the specific process outlined in the drawing, it may be assumed that the starting material is crude acetylene tetrachloride which has been produced by reacting acetylene with chlorine under such conditions that impurities are present including one or more of the following compounds: phosgene, excess chlorine, hydrogen chloride, iron and ferric chloride. Compounds, such as traces of chlorinated hydrocarbons other than acetylene tetrachloride, may also be present. In accordance with the process represented in the drawing, the impure acetylene tetrachloride is subjected to a water wash. This is preferably accomplished by intimately mixing the crude acetylene tetrachloride with water at approximately room temperature (20° C.). The mixture of acetylene tetrachloride and water forms two distinct phases, and the water phase is separated by gravity from the organic phase. In this manner, water soluble salts such as ferric chloride and the like are removed from the acetylene tetrachloride. The majority of the impurities including organic compounds which are insoluble in water remain.

The water-washed acetylene tetrachloride is then treated chemically with an aqueous solution of an alkaline compound, such solution having a pH in the range of about 7 to 12. This chemical treatment may be effected by intimately mixing the chlorinated hydrocarbon and the alkaline solution, utilizing any suitable and available mixing equipment. Other physical means for accomplishing the desired mixing will readily become apparent.

The alkaline solution may have any desired concentration up to saturation at temperatures at approximately room temperature. Chemicals which are suitable for use in the alkaline treating solutions are alkali metal carbonates, bicarbonates, sesqui carbonates, pyrophosphates, polyphosphates, monohydrogen orthophosphates and borates, for example. Equivalent alkali metal compounds may be substituted provided the solution has a pH in the range of 7 to 12.

In accordance with the process, the aqueous alkaline solution is contacted with the acetylene tetrachloride for a time sufficient to complete a plurality of reactions which convert the impurities to substances which are soluble in water. For example, phosgene is converted into sodium chloride and carbon dioxide which are taken up in the aqueous alkaline solution. Similarly excess chlorine is converted to sodium chloride and to sodium hypochlorite which are taken up in the aqueous alkaline solution. Any hydrochloric acid which is present in the acetylene tetrachloride is, of course, converted to sodium chloride.

The aqueous alkaline solution is separated from the remaining organic phase which contains principally acetylene tetrachloride together with traces of other chlorinated compounds. The organic phase is then washed with water and the water is separated by gravity, removing traces of alkaline solution. The organic liquid is then dried by any one of several well-known methods. The resulting purified acetylene tetrachloride is then catalytically cracked, producing very pure trichlorethylene and hydrogen chloride. Both these products are so free of impurities that they may readily be used for a wide variety of commercial applications. The hydrogen chloride is sufficiently free of impurities that it constitutes an excellent raw material for the preparation of vinyl chloride.

If desired, the purified acetylene tetrachloride, after gravity separation of the traces of alkaline solution, may be distilled in order to remove traces of water as a lower boiling azeotrope with either "light" organics or with the acetylene tetrachloride. The dry liquid is distilled to remove the acetylene tetrachloride from high boiling organic materials, resulting in an essentially pure water white product which is entirely suitable for industrial use or for thermal or catalytic cracking as heretofore described.

The following examples are illustrative of the process:

*Example 1*

Acetylene is chlorinated in a steel container in which liquid acetylene tetrachloride is present. The liquid tetrachloride contains free iron or iron compound such as ferric chloride which serves as a chlorinating catalyst. The temperature is maintained considerably below the boiling point of the acetylene tetrachloride by external cooling. Since the chlorination of acetylene is an exothermic reaction, cooling is necessary to avoid excessively rapid reaction. Preferably, an excess of chlorine is introduced into the liquid with the acetylene and the points of entry of the two gases are so adjusted to bring about intimate mixing with the tetrachloride before the gases contact one another.

The crude acetylene tetrachloride product was analyzed and found to contain 2740 p.p.m. $FeCl_3$, 1145 p.p.m. $Cl_2$ and 2050 p.p.m. HCl.

Attempts to remove these contaminants by physical separation in a fractionation column packed with raschig rings produced a product containing 435 p.p.m. $FeCl_3$, 22 p.p.m. $Cl_2$ and 371 p.p.m. HCl.

However, when the crude tetrachloride was washed with water, separated by gravity, and mixed with a 10% solution of $Na_2CO_3$ (sodium carbonate) having a pH of approximately 11.7, followed by gravity separation of the organic phase and the carbonate solution, produced a purified acetylene tetrachloride containing substantially zero p.p.m. of $FeCl_3$, $Cl_2$ and HCl.

The purified acetylene tetrachloride product was vaporized in special metal vaporizers into a steel chamber containing activated carbon granules held at a temperature of at least 210° C. and preferably about 225° C. The catalyst chamber was heated continuously by means of an external heater. As the acetylene tetrachloride passes over the catalyst it splits off into trichlorethylene and hydrogen chloride. The activated carbon may be impregnated with $BaCl_2$; however, activated carbon alone serves as a satisfactory catalyst. The trichlorethylene and hydrogen chloride are separated by cooling, and both products are ideally suited for a wide variety of industrial purposes which require pure trichlorethylene or pure hydrogen chloride.

*Example 2*

Various solutions of sodium carbonate were substituted for the aqueous alkaline solution of Example 1, without changing the method steps. Such solutions included by weight 10%, 2% and 0.5% sodium carbonate. In each case, the acetylene tetrachloride product was analyzed and found to contain zero p.p.m. $FeCl_3$, $Cl_2$, and HCl.

*Example 3*

The following table illustrates aqueous alkaline solutions which provide excellent results using the procedure of Example 1.

| Compound: | Percent by weight at 20° C. |
|---|---|
| Sodium carbonate | .01 to 17.7 |
| Potassium carbonate | .01 to 52.5 |
| Sodium sesqui carbonate | .01 to 16.0 |
| Sodium pyrophosphate | .01 to 5.85 |
| Potassium pyrophosphate | .01 to 65.7 |
| Sodium tripolyphosphate | .01 to 15.3 |
| Sodium bicarbonate | .01 to 8.75 |
| Sodium mono hydrogen phosphate | .01 to 7.25 |
| $K_2HPO_4$ | .01 to 18.45 |
| Sodium borate (meta=$Na_2B_2O_4 \cdot 8H_2O$) | .01 to 20.5 |
| Sodium borate (tetra=$Na_2B_4O_7 \cdot 10H_2O$, borax) | .01 to 2.26 |
| Potassium borate (tetra) | .01 to 14.6 |

It is to be emphasized that many chlorinated hydrocarbons are apt to be dehydrochlorinated by strong alkali, producing dangerous products. Accordingly, it is a radical departure from the conventional art to treat crude acetylene tetrachloride with an aqueous alkaline solution having a pH of 7 to 12. Notwithstanding this factor, it has been found to be a fact that the acetylene tetrachloride is purified but is not dehydrochlorinated in accordance with this invention.

Although sodium and potassium compounds have been principally disclosed herein, it will be appreciated that the other alkali metal salts and equivalents may be substituted within the scope of this invention.

It will be appreciated that some of the method steps disclosed herein may be omitted under certain circumstances. For example, where the proportion of water-soluble metal salts in the impure acetylene tetrachloride is so small as to be insignificant, or where such salts are readily soluble in the aqueous alkaline solution, the preliminary water wash and gravity separation steps may be omitted. However, these steps are important in that the cost of operating the process is reduced.

It will further be appreciated that other features of the method may be modified, that equivalents may be substituted for the chemicals and solutions, including mixtures of the alkaline compounds, and that certain features may be used independently of other features, all in accordance with the spirit and scope of the invention as defined in the appended claims.

Having thus described our invention, we claim:

1. In a method for producing a grade of pure acetylene tetrachloride, which may be catalytically cracked to produce pure trichlorethylene and pure hydrogen chloride, from crude acetylene tetrachloride containing impurities selected from the class consisting of phosgene, chlorine, hydrogen chloride, iron, and iron chloride, without decomposition of the crude acetylene tetrachloride, the steps which comprise washing the crude acetylene tetrachloride and impurities with water, discarding the water phase, mixing the washed acetylene tetrachloride with an aqueous solution of a water soluble alkali metal compound selected from the group consisting of the carbonates, bicarbonates, sesqui carbonates, pyrophosphates, polyphosphates, monohydrogen orthophosphates, and borates, said solution having a pH in the range of about 7–12, and separating the purified acetylene tetrachloride from the resulting aqueous phase.

2. The method of claim 1 wherein the cracking catalyst is activated carbon.

References Cited in the file of this patent

UNITED STATES PATENTS

| | | |
|---|---|---|
| 2,252,536 | Wiley | Aug. 12, 1941 |
| 2,356,785 | Hammond | Aug. 29, 1944 |
| 2,359,218 | Hunt et al. | Sept. 26, 1944 |
| 2,418,109 | Sconce | Apr. 1, 1947 |
| 2,610,215 | Vanharen | Sept. 9, 1952 |
| 2,615,787 | Randlett | Oct. 28, 1952 |